(12) United States Patent
Lee et al.

(10) Patent No.: US 7,007,996 B2
(45) Date of Patent: Mar. 7, 2006

(54) LOCK OF INFORMATION REPRODUCER FOR CAR

(75) Inventors: Dong-Ho Lee, Seoul (KR); Wae-Yeul Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 264 days.

(21) Appl. No.: 10/698,789

(22) Filed: Oct. 30, 2003

(65) Prior Publication Data
US 2004/0093915 A1    May 20, 2004

(30) Foreign Application Priority Data
Nov. 19, 2002   (KR)   ................ 10-2002-0072083

(51) Int. Cl.
*B69N 3/12* (2006.01)
(52) U.S. Cl. .................... 296/37.8; 296/37.9
(58) Field of Classification Search ............. 296/37.8, 296/37.7, 1.07; 348/837
See application file for complete search history.

(56) References Cited

U.S. PATENT DOCUMENTS

| | | | | |
|---|---|---|---|---|
| 4,466,449 A | * | 8/1984 | Summers | .................. 296/37.9 |
| 4,816,945 A | * | 3/1989 | Watanabe | ................ 360/99.07 |
| 4,941,718 A | * | 7/1990 | Alexander et al. | ......... 296/37.8 |
| 5,184,489 A | * | 2/1993 | Squires et al. | ........... 296/37.12 |
| 5,297,767 A | * | 3/1994 | Miller et al. | ............. 248/311.2 |
| 5,299,083 A | * | 3/1994 | Kawada | .................... 360/266.7 |
| 5,633,768 A | * | 5/1997 | Watanabe | ................ 360/99.01 |
| 6,213,533 B1 | * | 4/2001 | Widulle et al. | ............ 296/37.8 |
| 6,219,323 B1 | * | 4/2001 | Fukatsu et al. | ............. 720/650 |
| 6,241,300 B1 | * | 6/2001 | Suzuki | ...................... 296/37.8 |
| 6,647,819 B1 | * | 11/2003 | Chang | ...................... 74/421 A |
| 6,731,350 B1 | * | 5/2004 | Endo et al. | ................. 348/837 |
| 6,808,214 B1 | * | 10/2004 | Sato et al. | ............... 296/37.12 |
| 6,913,029 B1 | * | 7/2005 | Zorich et al. | .............. 134/95.1 |
| 6,929,305 B1 | * | 8/2005 | Park | .......................... 296/37.9 |
| 2002/0149708 A1 | * | 10/2002 | Nagata et al. | .............. 348/837 |

* cited by examiner

*Primary Examiner*—Kiran B. Patel
(74) *Attorney, Agent, or Firm*—Lee, Hong, Degerman, Kang & Schmadeka

(57) ABSTRACT

In a lock of information reproducer for car, when a passenger or a driver stays in a car, in more detail, only when a car key is inserted into a car key holder (power of the car is ON), an information reproducer can be detached from a contact support unit, when the key is taken out of the key holder, the information reproducer can not be detached from the contact support unit, and accordingly theft of the information reproducer can be efficiently prevented in parking.

20 Claims, 23 Drawing Sheets

LOCK OF INFORMATION REPRODUCER FOR CAR

BACKGROUND OF THE INVENTION

1. Field of the Invention

The present invention relates to a lock of information reproducer for car, and in particular to a lock of information reproducer for car capable of preventing theft of an information reproducer detachably installed in a car.

2. Description of the Related Art

An information reproducer such as a CD player or a digital video disc player, etc. is detachably installed in a car.

FIG. 1 is a perspective view illustrating an information reproducer, FIG. 2 is a perspective view illustrating a contact supporting unit installed at a ceiling of a car, FIG. 3 is a perspective view illustrating the contact support unit to which the information reproducer is attached, and FIG. 4 is a perspective view illustrating use of the information reproducer.

As depicted in FIGS. 1~4, a contact supporting unit 21 is fixed to the ceiling of the car. The contact support unit 21 includes a reproducer receiving space 22; and a guide portion 23 formed at both inner sides to guide detachment of the reproducer 11.

In the meantime, when a passenger pushes the reproducer 11 into the receiving space 22 of the contact support unit 21 in order to listen to the music, etc., the reproducer 11 is electrically connected to the contact support unit 21, simultaneously power is supplied to the reproducer 11, and accordingly the reproducer 11 can be operated.

However, in the conventional art, because the reproducer can be easily detached from the contact support unit, the, reproducer may be robbed easily when a passenger is away from the car.

SUMMARY OF THE INVENTION

In order to solve the above-mentioned problem, it is an object of the present invention to provide a lock of information reproducer for car capable of preventing theft of a car information reproducer efficiently by making the reproducer detach from a contact support unit only when a car key is inserted into a key holder.

In order to achieve the above-mentioned object, a lock of information reproducer for car in accordance with the present invention includes a contact support unit fixed to an inner side of a car so as to have a receiving space for receiving an information reproducer; a separation preventive groove formed at one of the top surface or bottom surface of the information reproducer; a separation preventive member installed in the contact support unit in order to restrict detachment of the information reproducer inserted into the receiving space by being selectively inserted into the separation preventive groove; a fixing groove formed at one of the top surface or bottom surface of the information reproducer; a position fixing member installed in the contact support unit so as to be movable up and down elastically in order to fix a position of the information reproducer inserted into the receiving space by being selectively inserted into the fixing groove; a rotary disk rotatively installed in the contact support unit in order to move the separation preventive member and the position fixing member up and down selectively; a rotary disk driving means installed in the contact support unit in order to rotate the rotary disk; and a release button installed at a side of the contact support unit in order to release elective connection between the information reproducer and the contact support unit selectively.

In addition, a lock of information reproducer for car in accordance with the present invention includes a contact support unit fixed to an inner side of a car so as to have a receiving space for receiving an information reproducer; a separation preventive groove formed at one of the top surface or bottom surface of the information reproducer; a separation preventive member installed in the contact support unit in order to restrict detachment of the information reproducer inserted into the receiving space by being selectively inserted into the separation preventive groove; a separation preventive member driving means installed in the contact support unit in order to move the separation preventive member up and down selectively; and a release button installed at a side of the contact support unit in order to release elective connection between the information reproducer and the contact support unit selectively.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
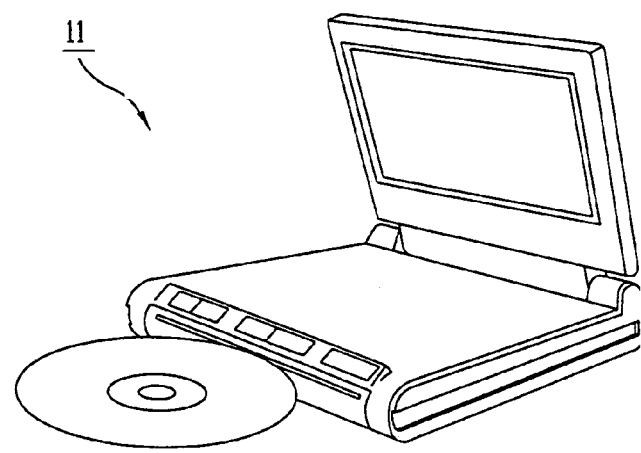
FIG. 1 is a perspective view illustrating an information reproducer.
Figure 2:
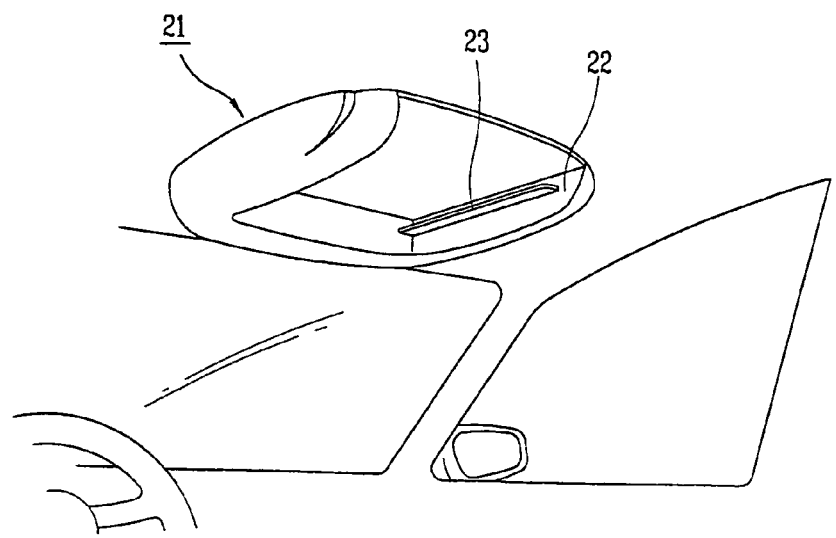
FIG. 2 is a perspective view illustrating a contact supporting unit installed at a ceiling of a car.
Figure 3:
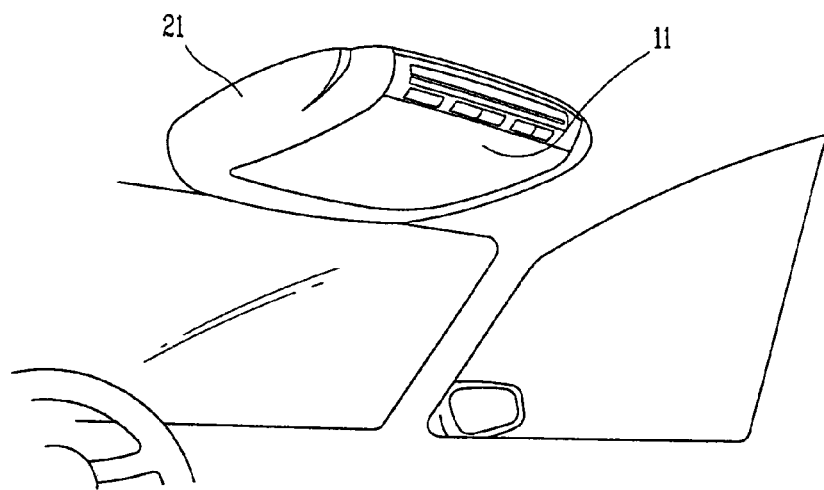
FIG. 3 is a perspective view illustrating the contact support unit to which the information reproducer is attached.
Figure 4:
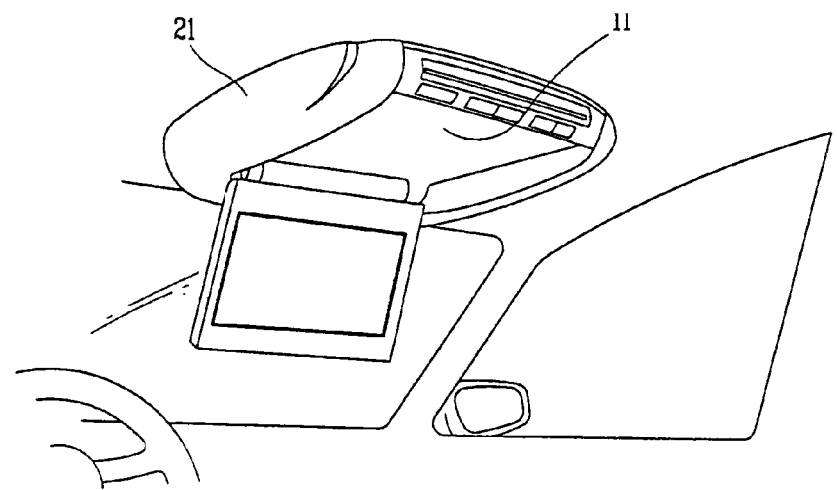
FIG. 4 is a perspective view illustrating use of the information reproducer.
Figure 5:
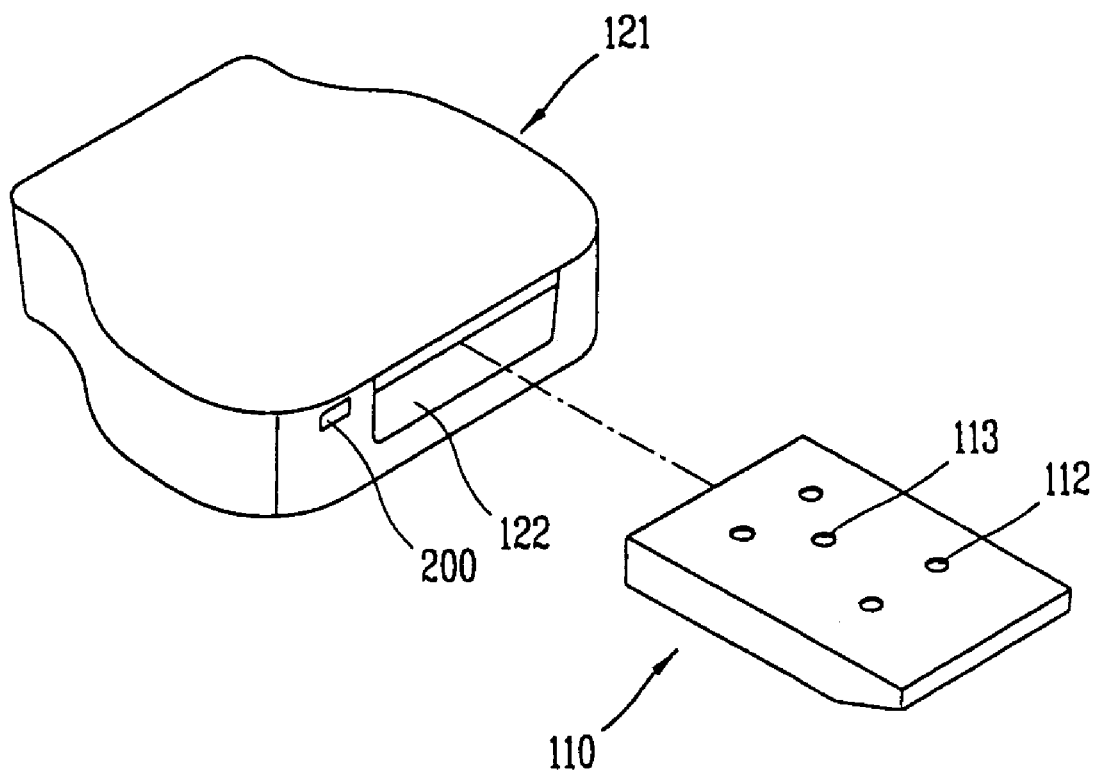
FIG. 5 is a perspective view illustrating a contact support unit and an information reproducer in accordance with the present invention.

Hereinafter, the preferred embodiment of a lock of information reproducer for car in accordance with the present invention will be described with reference to accompanying drawings.

As depicted in FIGS. 5~18B, the lock for the car information reproducer in accordance with the present invention includes a contact support unit 121 fixed to an inner side of a car so as to have a receiving space 122 for receiving an information reproducer 110; a separation preventive groove 113 formed at one of the top and bottom of the information reproducer 110; a separation preventive member 140 installed in the contact support unit 121 to restrict detachment of the information reproducer 110 inserted into the receiving space 122 by being selectively inserted into the separation preventive groove 113; a fixing groove 112 formed at one of the top and bottom of the information reproducer 110; a position fixing member 130 installed in the contact support unit 121 so as to be elastically movable up and down in order to fix a position of the information reproducer 110 inserted into the receiving space 122 by being selectively inserted into the fixing groove 112; a rotary disk 160 rotatively installed in the contact support unit 121 in order to move selectively the separation preventive member 140 and the position fixing member 130 up and down; a rotary disk driving means installed in the contact support unit 121 in order to rotate the rotary disk 160; a detachment lever 150 installed at an inner side of the contact support unit 121 in order to detach the information reproducer 110 inserted into the receiving space 122 selectively; a detachment lever driving means installed at the other inner side of the contact support unit 121 in order to operate the detachment lever 150; and a release button 200 installed at a side of the contact support unit 121 in order to release elective connection between the information reproducer 110 and the contact support unit 121 selectively.

As depicted in FIGS. 8~11, a cam contact surface 144 is formed at a side of the separation preventive member 140, and a separation preventive member cam 165 is formed at the rotary disk 160 as one body so as to be selectively contacted with the cam contact surface 144 of the separation preventive member 140.

The separation preventive member 140 has a spring receiving space 142 at the center, a hinge protrusion portion 143 is formed at a side of the spring receiving space 142, and a separation preventive protrusion 141 is formed at the other side of the spring receiving space 142 so as to be inserted into the separation preventive groove.

A slant surface 141a is formed at the end of the separation preventive protrusion 141, herein, the slant surface 141a is slanted toward a certain direction to make the separation preventive member 140 move up and down elastically by being contacted with the attached/detached information reproducer 110.

In addition, the position fixing member 130 is installed so as to be adjacent to the rotary disk 160 in order to be moved up and down by the rotary disk 160.

The position fixing member 130 includes a fixing protrusion 131 inserted into the fixing groove 112; a spring receiving portion 132 for receiving a spring 133; and a cam contact surface 134 selectively contacted to the cam contact surface 132. A position fixing member cam 166 is formed at the rotary disk 160 so a to be selectively contacted with the cam contact surface 134.

The rotary disk 160 includes a central axis 163; plural separation preventive member through holes 161 formed at the outline to receive the separation preventive member 140; a position fixing member through hole 162 formed at the center to receive the position fixing member 130; a separation preventive member cam 165 projected-formed at the outer circumference of the separation preventive member through hole 162; and a position fixing member cam 166 projected-formed at the outer circumference of the position fixing member through hole 162.

Figure 9:
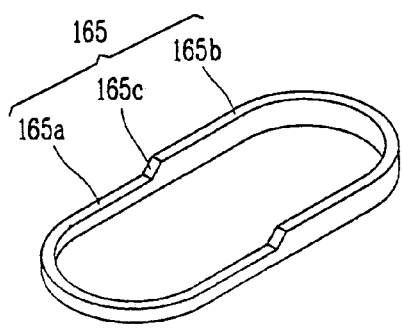
FIG. 9 is a perspective view illustrating a fixing protrusion cam of the rotary disk in accordance with the present invention.

As depicted in FIG. 9, the separation preventive member cam 165 consists of a lower surface 165a, an upper surface 165c and a slant surface 165b.

Figure 10:
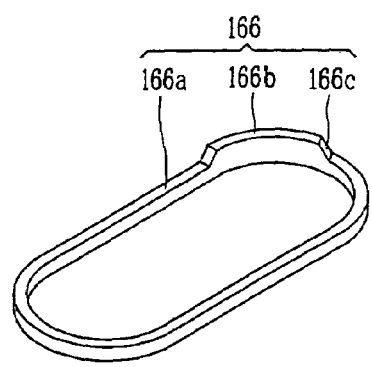
FIG. 10 is a perspective view illustrating a separation preventive protrusion cam in accordance with the present invention.
Figure 11:
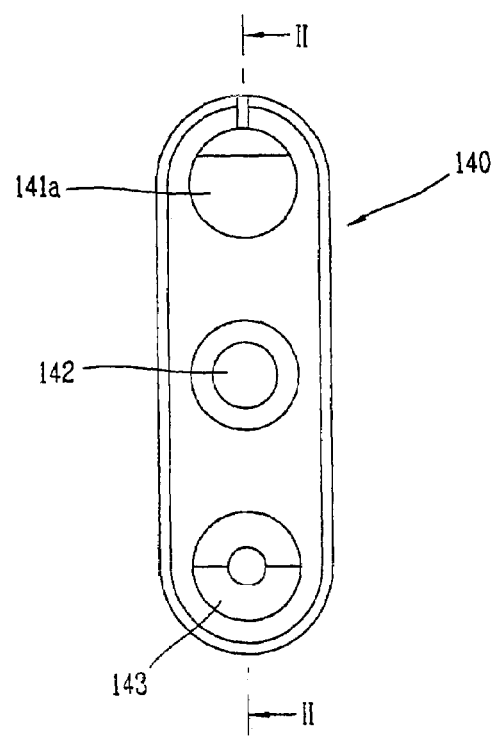
FIG. 11 is a plane view illustrating a separation preventive member in FIG. 6.
Figure 12:
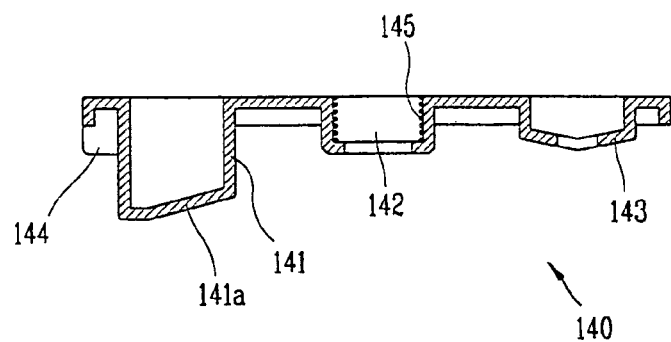
FIG. 12 is a sectional view taken along a line II—II in FIG. 11.
Figure 13:
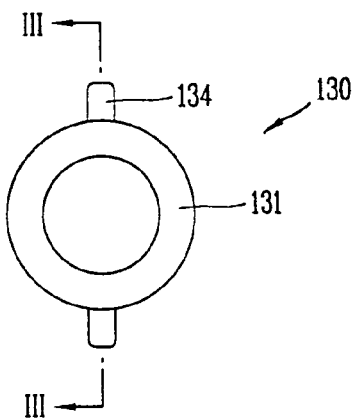
FIG. 13 is a plane view illustrating a position fixing member in FIG. 6.
Figure 14:
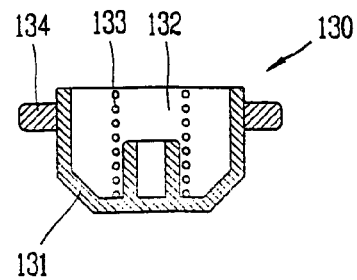
FIG. 14 is a sectional view taken along a line III—III in FIG. 13.

As depicted in FIG. 10, the position fixing member cam 166 consists of a lower surface 166a, an upper surface 166c and a slant surface 166b.

Figure 15:
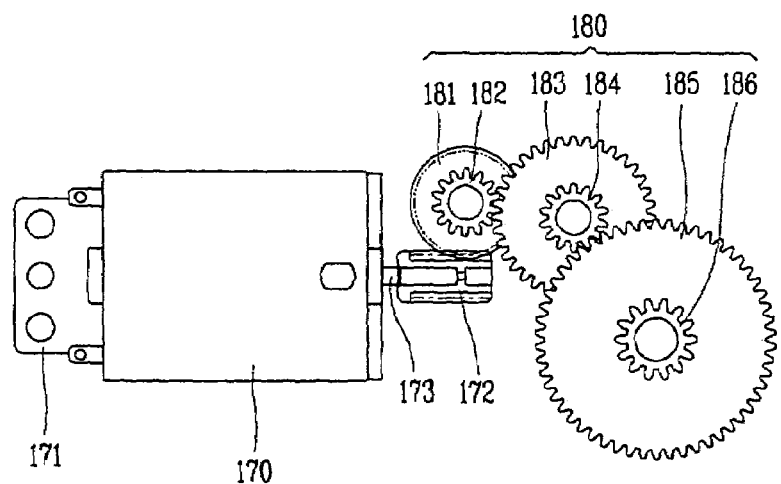
FIG. 15 is a plane view illustrating a rotary disk driving means in FIG. 6.
Figure 16:
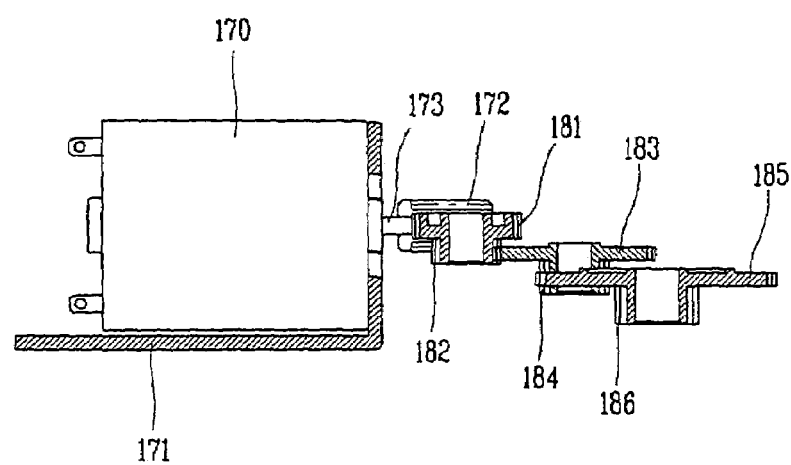
FIG. 16 is a longitudinal-sectional view illustrating the rotary disk driving means in FIG. 6.
Figure 17:
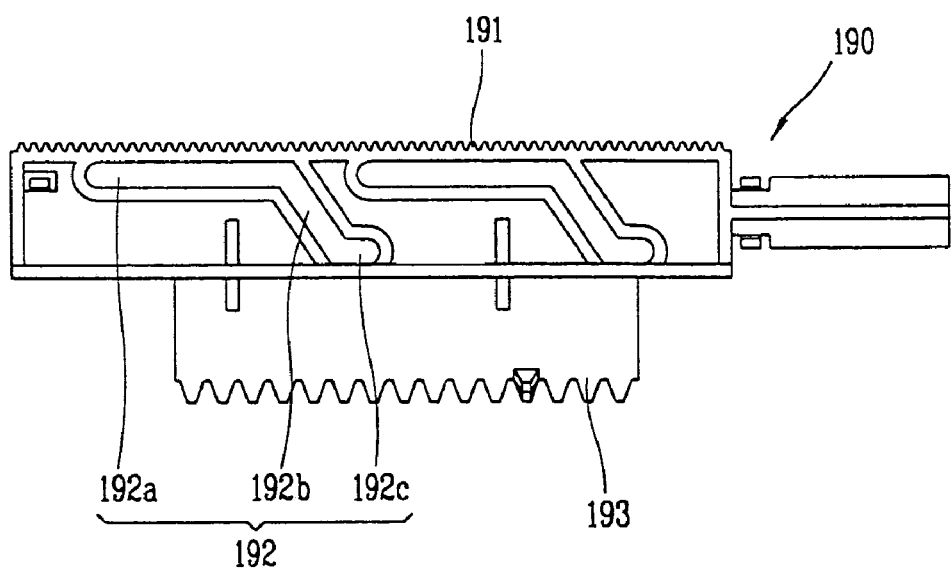
FIG. 17 is a plane view illustrating a detachment lever cam member in FIG. 6.

In addition, as depicted in FIGS. 15~17, a rotary disk driving means for rotating the rotary disk 160 includes a rotary disk gear unit 164 formed at the outer circumference of the rotary disk 160; a rack member 193 combined with the rotary disk gear unit 164 (reference to FIG. 8); a gear set 180 combined with the rack member 193; and a driving motor 170 combined with the gear set 180.

The driving motor 170 is fixed to the contact support unit 121 by a motor position fixing portion 171. The gear set 180 includes a worm gear 181 formed so as to be engaged with a worm 172; a second gear 182 arranged at the same axis of the worm gear 181; a third gear 183 engaged with the second gear 182; a fourth gear 184 formed at the same axis of the third gear 183; a fifth gear 185 engaged with the fourth gear 184; and a sixth gear 186 formed at the same axis with the fifth gear 185.

Figure 18A:
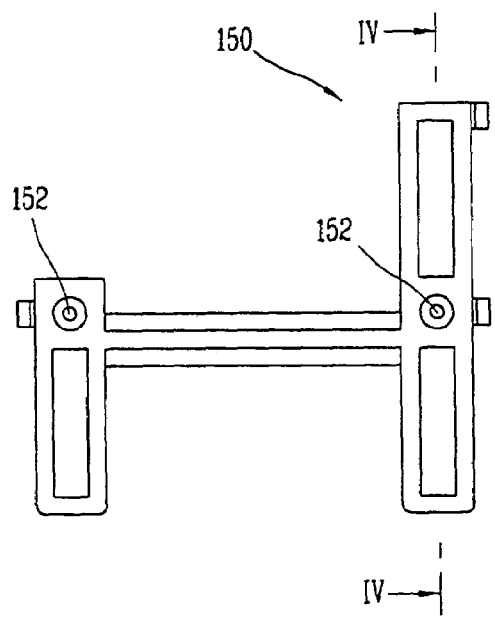
FIG. 18A is a plane view illustrating a detachment lever in FIG. 6.
Figure 18B:
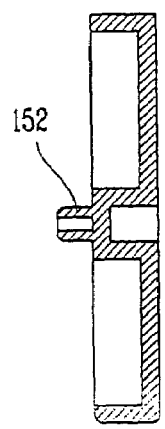
FIG. 18B is a sectional view taken along a line IV—IV in FIG. 18A.

In addition, as depicted in FIGS. 17~18B, the detachment lever driving means includes a cam protrusion 152 formed at the detachment lever 150; and a detachment lever cam member 190 having a cam groove for receiving the cam protrusion 152.

The detachment lever cam member 190 includes a disk rack 193 formed so as to be engaged with the gear set 180.

According to the operation of the driving motor 170, in order to make the fixing protrusion 131 move to a release position and make the detachment lever 150 move to the detachment position after the separation preventive protrusion 141 is moved to the release position, a detachment lever cam groove 192 is formed at a side of the detachment lever cam member 190. The gear set rack 191 is formed so as to be engaged with the sixth gear 186. The detachment lever cam groove 192 consists of a upper surface 192a, a slant surface 192b and a lower surface 192c. Reference numeral S is a sensor for sensing approach of the information reproducer, and reference numeral B is a base for supporting the separation preventive member and the position fixed member.

a S is a sensor for detecting the information reproducer 110 when the information reproducer 110 is fully inserted into the receiving space 122.

The operation of the lock for the car information reproducer in accordance with the present invention will be described.

Figure 6:
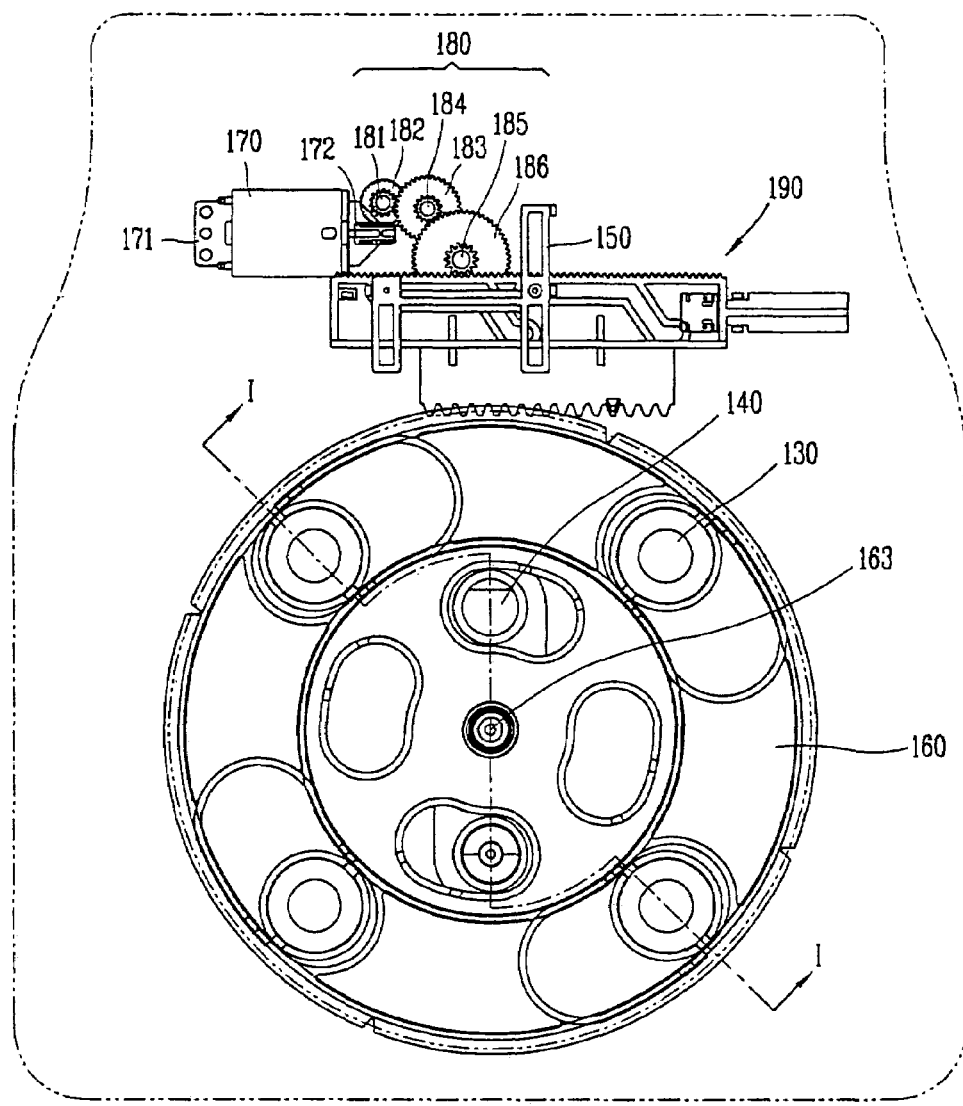
FIG. 6 is a plane view illustrating a lock installed in the contact support unit.
Figure 7:
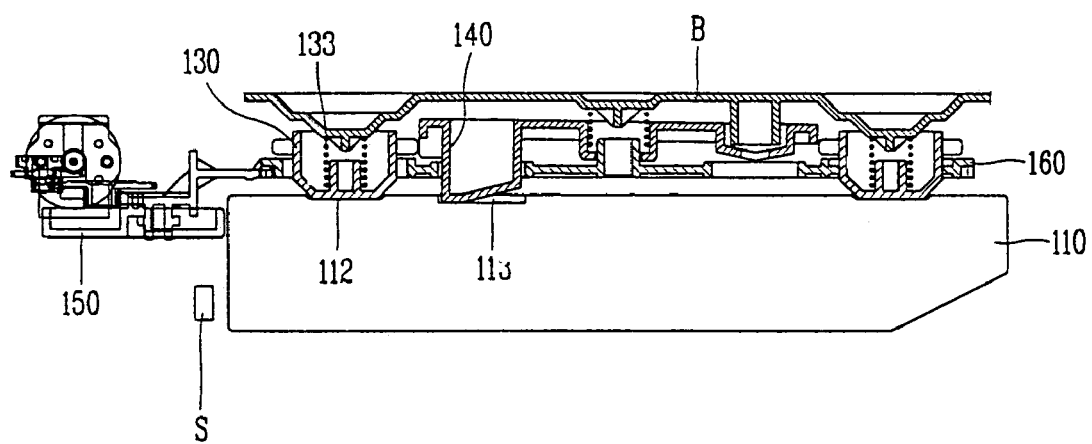
FIG. 7 is a longitudinal-sectional view taken along a line I—I in FIG. 6.
Figure 8:
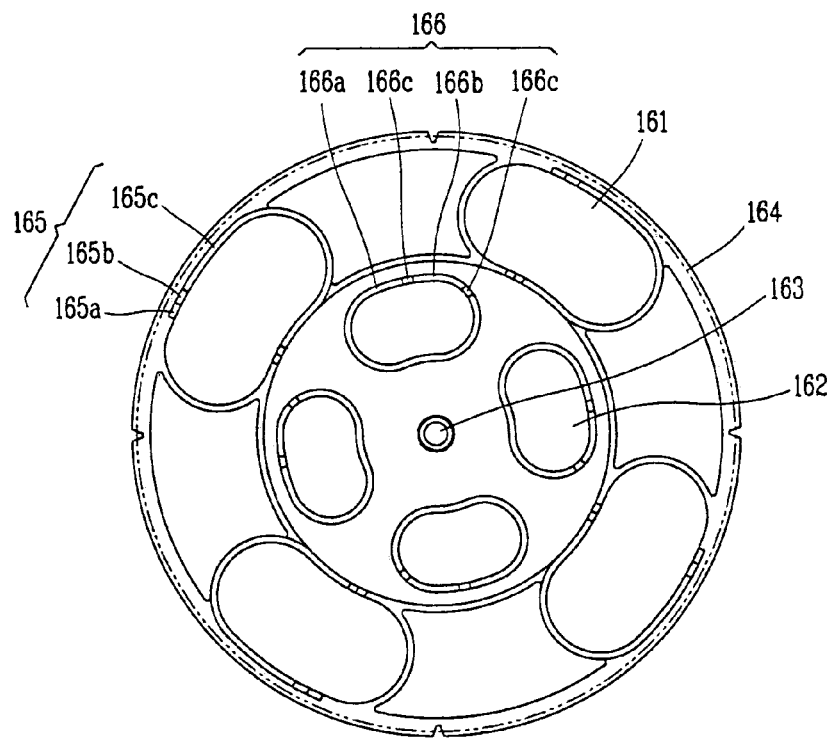
FIG. 8 is a plane view illustrating a rotary disk in accordance with the present invention.

FIG. 6 is a plane view illustrating a lock installed in the contact support unit, and FIG. 7 is a longitudinal-sectional view taken along a line I—I in FIG. 6.

As depicted in FIGS. 6 and 7, at a lock position in which the separation preventive protrusion 141 is received in the separation preventive groove 111, separation of the information reproducer 110 is prevented, the fixing protrusion 131 is placed at a fixing position in which it is received in the fixing groove 111, and accordingly the information reproducer 110 is tightly contacted-fixed to the contact support unit 121. Accordingly, the information reproducer is located at a correct position, and it is possible to reduce impact on the information reproducer 110 due to vibration of the car.

In addition, when the information reproducer 110 is located at a lock position, it is impossible to detach the information reproducer 110 forcibly, theft can be prevented efficiently.

Figure 19:
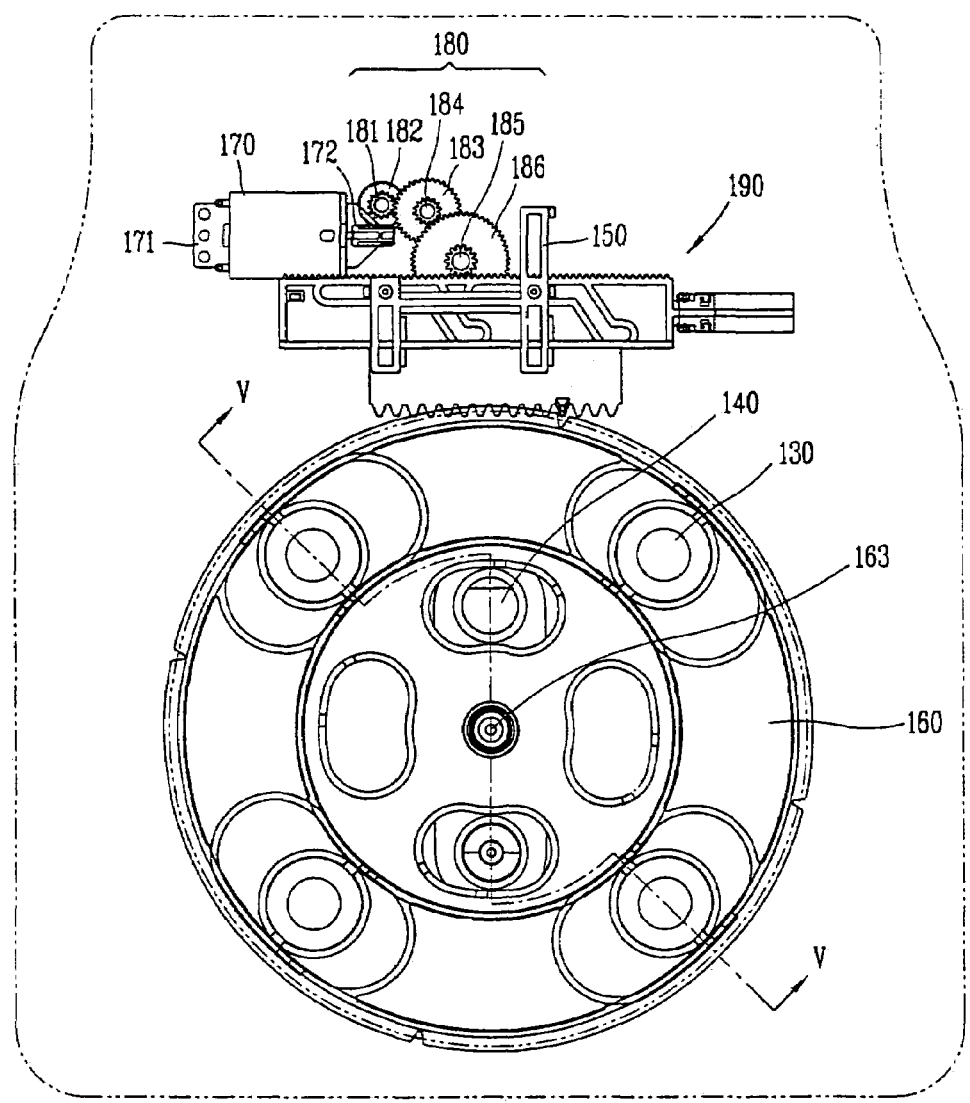
FIG. 19 is a plane view illustrating a lock in a standby state.
Figure 20:
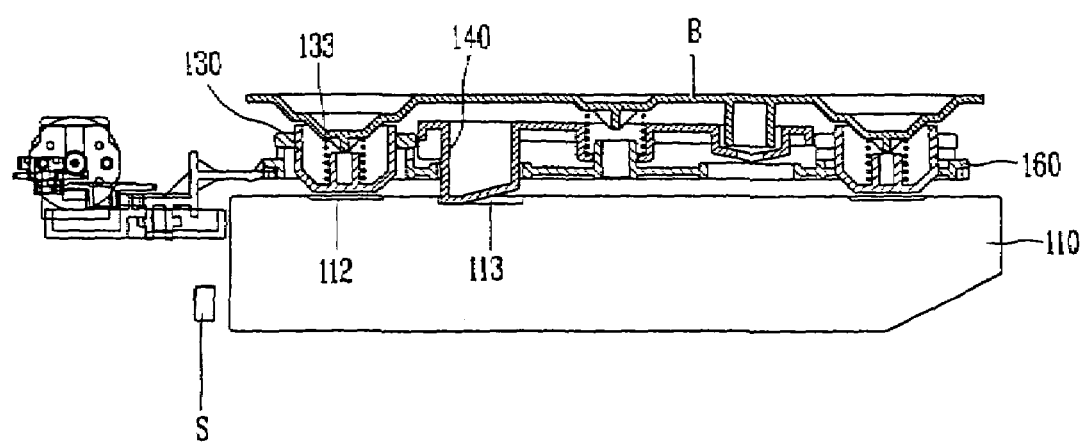
FIG. 20 is a sectional view taken along a line V—V in FIG. 19.

FIG. 19 is a plane view illustrating a lock in a standby state, and FIG. 20 is a sectional view taken along a line V—V in FIG. 19.

As depicted in FIGS. 19 and 20, when power is applied and a release button 200 is pressed, power is supplied the driving motor 170, a driving force of the driving motor 170 is transmitted to the gear set rack 191 through the driving axis 173, the worm 172, the worm gear 181, the second gear 182, the third gear 183, the fourth gear 184, the fifth gear 185 and the sixth gear 186, the detachment lever cam member 190 is moved to the left, and accordingly the cam disk 160 is rotated in the counter clockwise direction.

According to the rotation of the cam disk 160 in the counter clockwise direction, the fixing protrusion cam contact surface 134 is pressed by the upper surface 165b through the slant surface 166c of the fixing protrusion cam 166. Accordingly, the fixing protrusion 131 is located at a release position.

Figure 21:
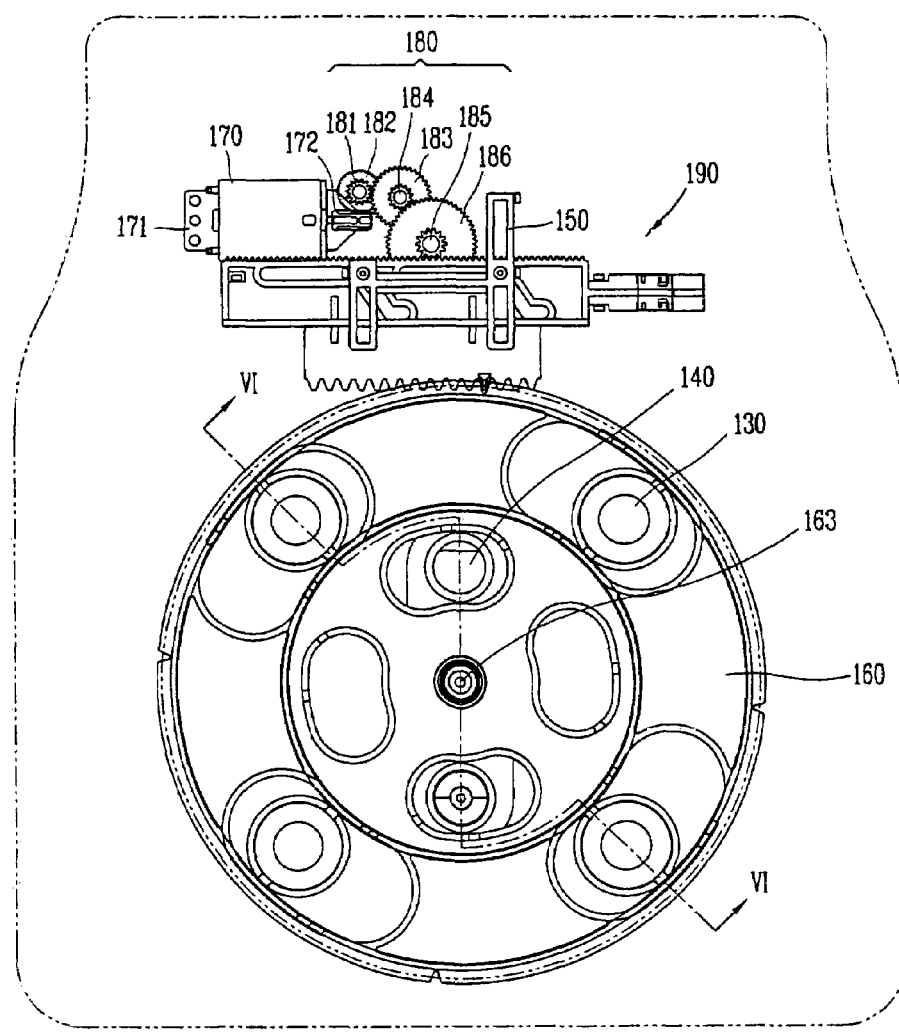
FIG. 21 is a plane view illustrating a lock in a detachment possible state.
Figure 22:
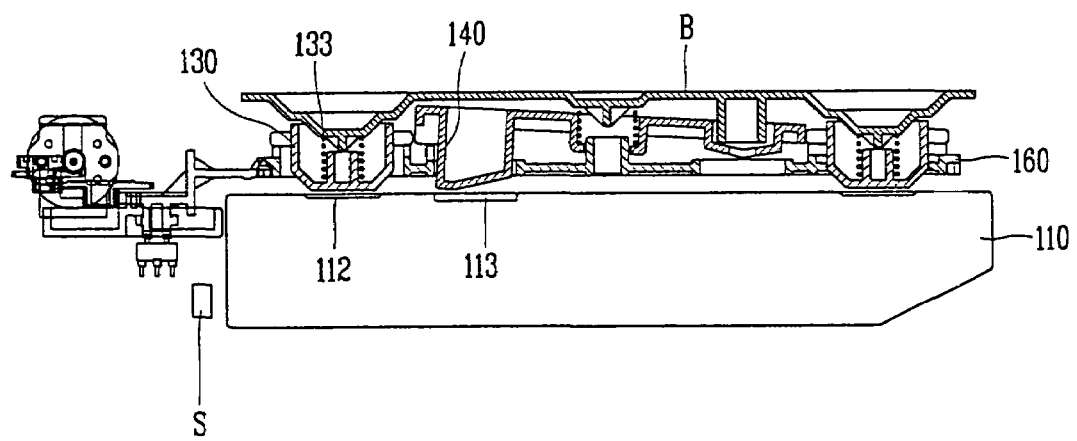
FIG. 22 is a sectional view taken along a line VI—VI in FIG. 21.

FIG. 21 is a plane view illustrating a lock in a detachment possible state, and FIG. 22 is a sectional view taken along a line VI—VI in FIG. 21.

As depicted in FIGS. 21 and 22, when the driving motor 170 rotates continually, the cam disk 160 is rotated continually in the counter clockwise direction, and accordingly the separation preventive protrusion cam contact surface 144 is pressed by the upper surface 165b through the slant surface 165c of the separation preventive protrusion cam 165. Accordingly, the separation preventive protrusion 141 is located at a release position.

Figure 23:
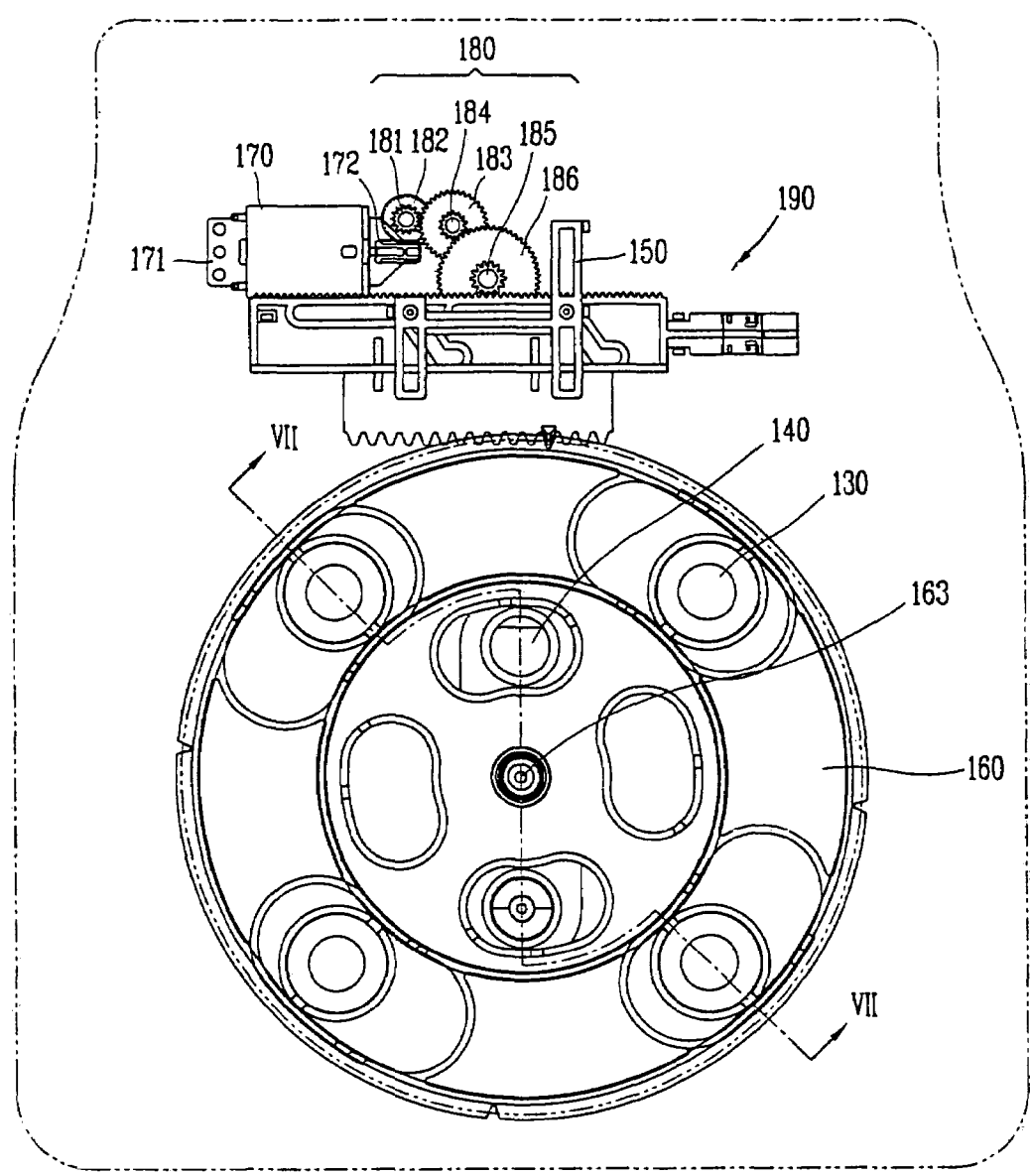
FIG. 23 is a plane view illustrating a lock in a detachment operation state.
Figure 24:
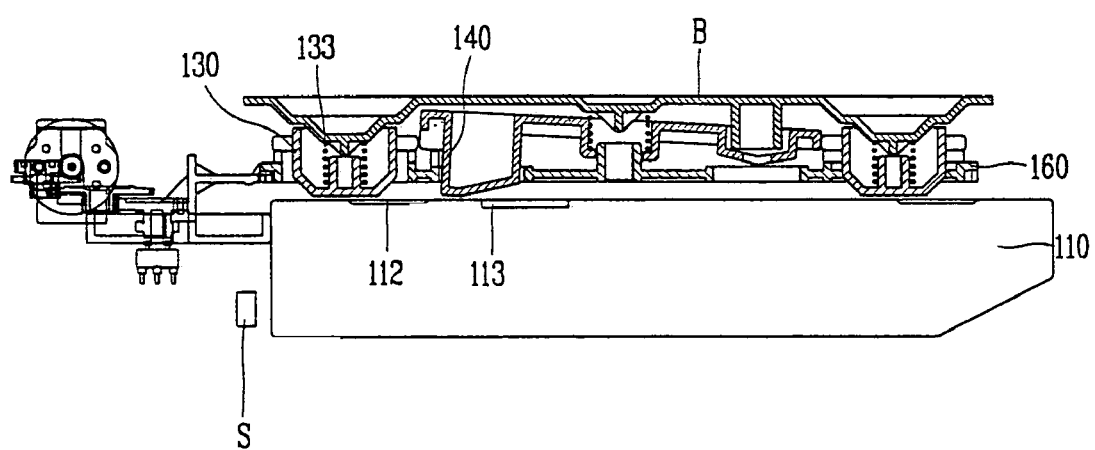
FIG. 24 is a sectional view taken along a line VII—VII in FIG. 23.

FIG. 23 is a plane view illustrating a lock in a detachment operation state, and FIG. 24 is a sectional view taken along a line VII—VII in FIG. 23.

As depicted in FIGS. 23 and 24, when the driving motor 170 is rotated continually, the detachment lever cam member 190 is moved to the left, the detachment lever cam protrusion 152 is located on the lower surface 192c through the upper surface 192a and the slant surface 192b, the detachment lever 150 is moved from an attachment position to a detachment position, and accordingly the information reproducer 110 is pushed out.

As described above, by using the driving force of the driving motor 170 driven by power of the car, the information reproducer 110 is detached, when the driving motor 170 is not used, the information reproducer 110 is fixed by the fixed protrusion 131 and the separation preventive protrusion 141. In more detail, when a car key is not inserted into a key holder, it is impossible to detach the information reproducer 110, and accordingly theft after parking can be efficiently prevented.

In addition, by tightly contacting-fixing the information reproducer 110 to the contact support unit 121 by using the fixing protrusion 131, it is possible to reduce impact on the information reproducer 110 due to vibration.

Figure 25:
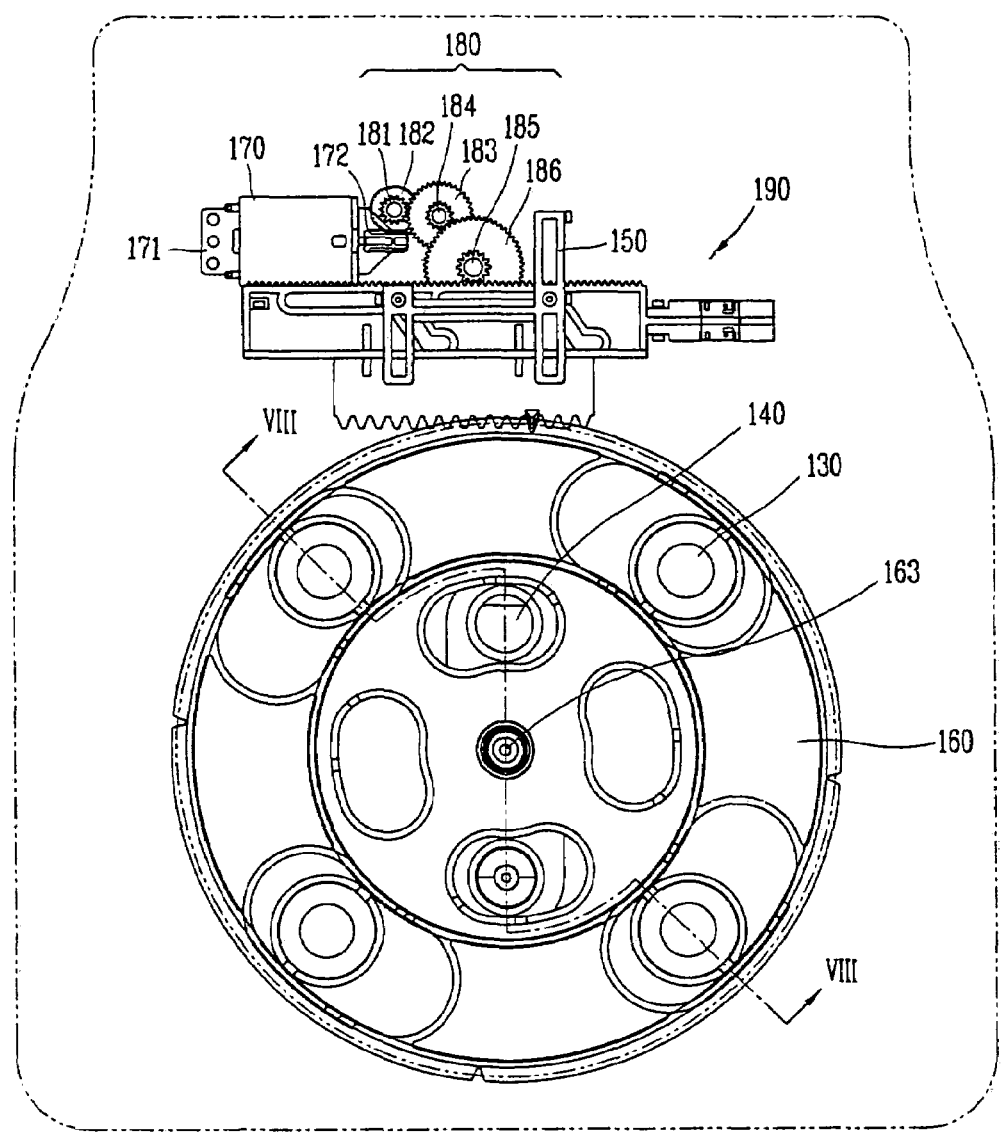
FIG. 25 is a plane view illustrating a lock in a standby state.
Figure 26:
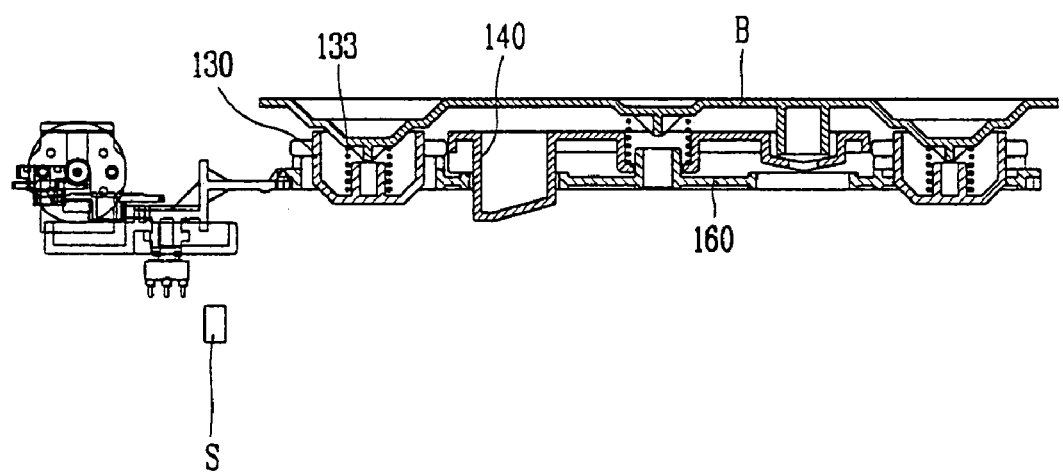
FIG. 26 is a sectional view taken along a line VIII—VIII in FIG. 25.

FIG. 25 is a plane view illustrating a lock in a standby state, and FIG. 26 is a sectional view taken along a line VIII—VIII in FIG. 25.

As depicted in FIGS. 25 and 26, when detachment of the information reproducer 110 is finished, by the reverse-ration of the driving motor 170, the detachment lever 150 is located at an installation position, and the separation preventive protrusion 141 is located at a lock position.

Figure 27:
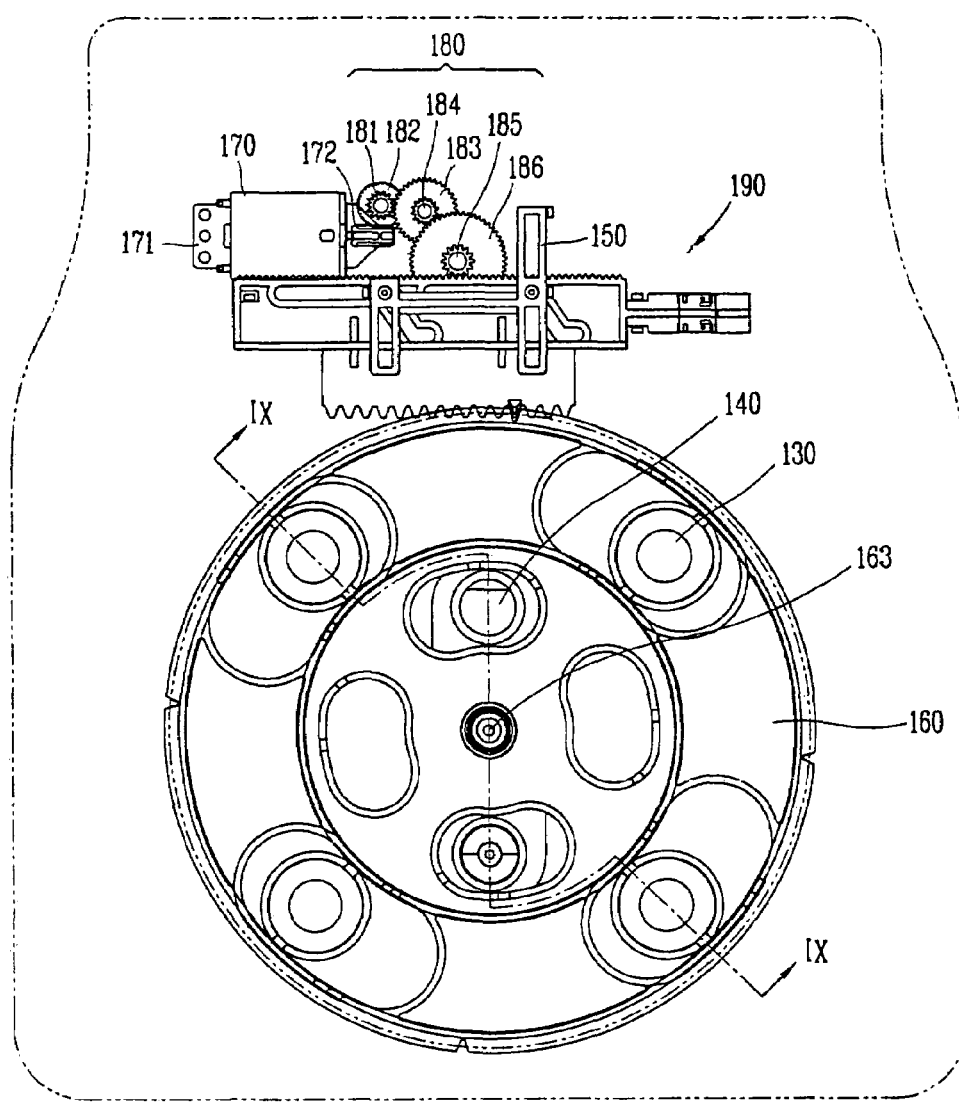
FIG. 27 is a plane view illustrating a lock in an attachment operation state.
Figure 28:
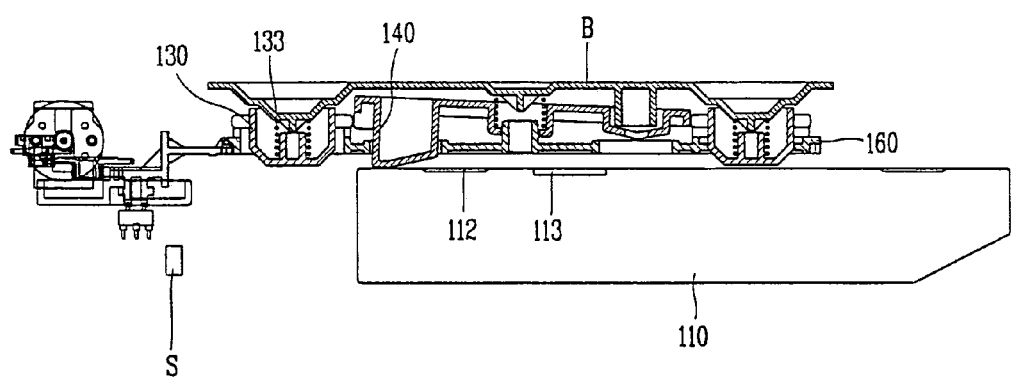
FIG. 28 is a sectional view taken along a line IX—IX in FIG. 27.

FIG. 27 is a plane view illustrating a lock in an attachment operation state, and FIG. 28 is a sectional view taken along a line IX—IX in FIG. 27.

As depicted in FIGS. 27 and 28, when the information reproducer 110 is inserted into the receiving space 122, the information reproducer 110 presses the slant surface 141a of the separation preventive protrusion 141, the separation preventive protrusion 141 presses the spring 145 and is moved to a release position, and accordingly the information reproducer 110 is inserted easily.

Figure 29:
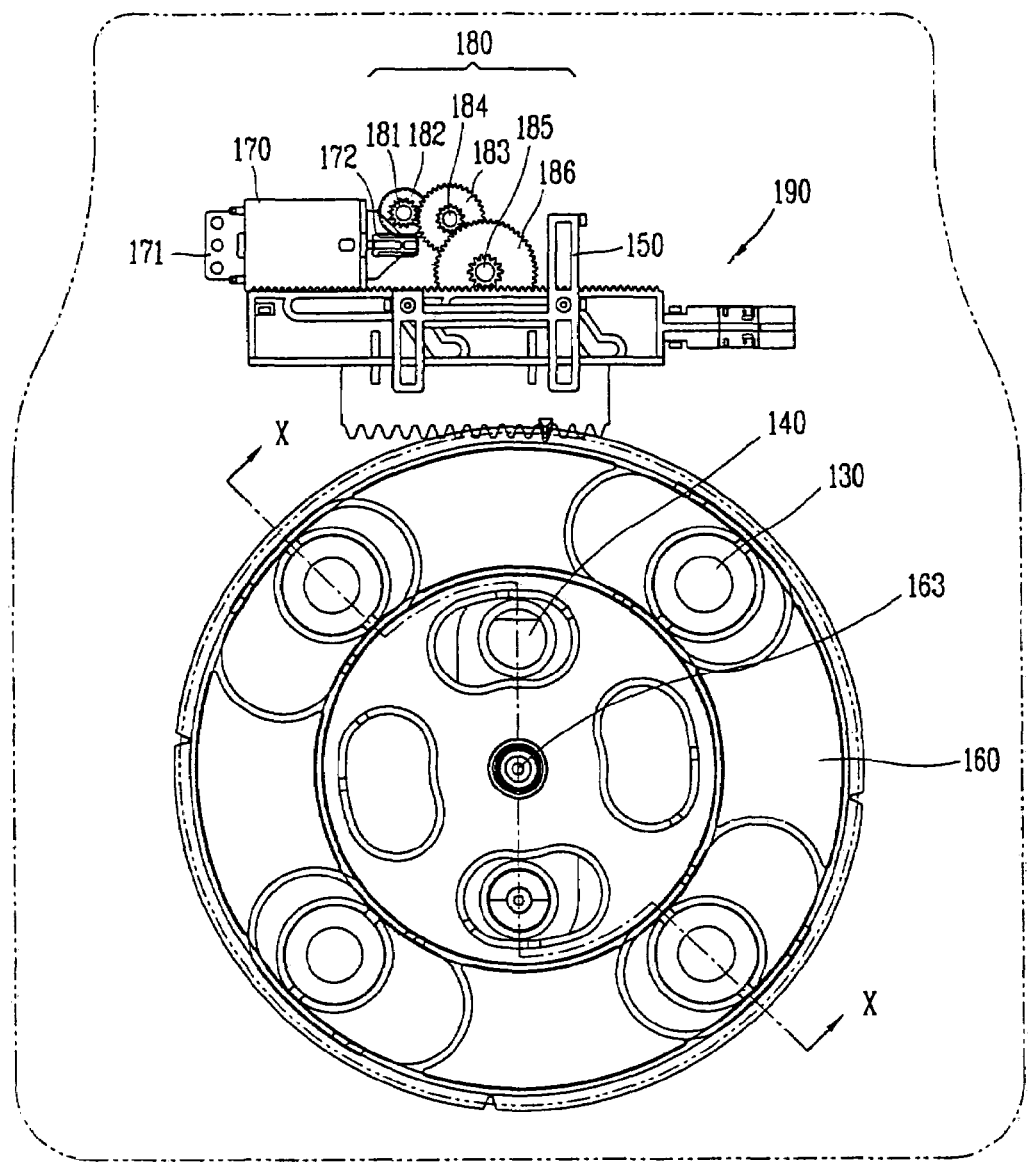
FIG. 29 is a plane view illustrating a lock in a standby state.
Figure 30:
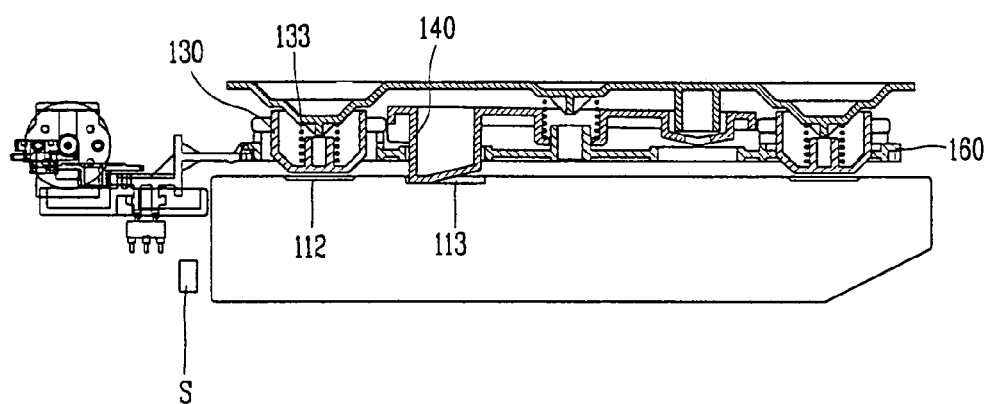
FIG. 30 is a sectional view taken along a line X—X in FIG. 29.

FIG. 29 is a plane view illustrating a lock in a standby state, and FIG. 30 is a sectional view taken along a line X—X in FIG. 29.

As depicted in FIGS. 29 and 30, when the information reproducer 110 is fully inserted into the receiving space 122, the separation preventive protrusion 141 is located at the separation preventive groove 113, and accordingly it is located at a lock position by the restoring spring 145.

As described-above, attachment of the information reproducer 110 is performed regardless of power apply, and accordingly it is possible to insert the information reproducer 110 even when power of the car is off.

As described-above, in the present invention, by using a driving force of a driving motor operated by power of a car, an information reproducer is selectively detached, by fixing the information reproducer with a fixing protrusion and a separation preventive protrusion, when a car key is not inserted into a car key holder, it is impossible to detach the information reproducer and accordingly theft problem after parking can be efficiently solved.

In addition, by tightly contacting/fixing the information reproducer to the contact support unit with the fixing protrusion, it is possible to reduce impact on the information reproducer.

In addition, attachment the information reproducer is performed regardless of power apply, and accordingly it is possible to attach the information reproducer even power of the car is off.

What is claimed is:

1. A lock of information reproducer for car, comprising:
   a contact support unit fixed to an inner side of a car so as to have a receiving space for receiving an information reproducer;
   a separation preventive groove formed at one of the top surface or bottom surface of the information reproducer;
   a separation preventive member installed in the contact support unit in order to restrict detachment of the information reproducer inserted into the receiving space by being selectively inserted into the separation preventive groove;
   a fixing groove formed at one of the top surface or bottom surface of the information reproducer;
   a position fixing member installed in the contact support unit so as to be movable up and down elastically in order to fix a position of the information reproducer inserted into the receiving space by being selectively inserted into the fixing groove;
   a rotary disk rotatively installed in the contact support unit in order to move the separation preventive member and the position fixing member up and down selectively;
   a rotary disk driving means installed in the contact support unit in order to rotate the rotary disk; and
   a release button installed at a side of the contact support unit in order to release elective connection between the information reproducer and the contact support unit selectively.

2. The lock of claim 1, wherein a cam contact surface is formed at a side of the separation preventive member, a separation preventive member cam is formed at the rotary disk so as to be selectively contacted with the cam contact surface of the separation preventive member, and a spring is installed at the separation preventive member in order to support the separation preventive member elastically.

3. The lock of claim 1, wherein the rotary disk driving means includes:
   a rotary disk gear unit formed at the outer circumference of the rotary disk;
   a rack member combined with the gear unit of the rotary disk;
   a gear set combined with the rack member; and
   a driving motor combined with the gear set.

4. The lock of claim 1, wherein a position fixing member is installed in the contact support unit so as to be elastically movable up and down in order to fix a position of the information reproducer inserted into the receiving space by being selectively inserted into the fixing groove, a cam contact surface is formed at a side of the position fixing member, and a fixing protrusion cam is formed on the rotary disk so as to be selectively contacted with the cam contact surface.

5. The lock of claim 1 further comprising:
   a detachment lever installed at a side of the contact support unit in order to detach the information reproducer inserted into the receiving space selectively; and
   a detachment lever driving means installed at the other side of the contact support unit in order to operate the detachment lever.

6. The lock of claim 5, wherein the detachment lever driving means includes:
   a cam protrusion formed at the detachment lever; and
   a detachment lever cam member having a cam groove in which the cam protrusion is inserted.

7. The lock of claim 1 wherein the separation preventive member includes:
   a spring receiving space at the center;
   a hinge protrusion portion formed at a side of the spring receiving space; and
   a separation preventive protrusion formed at the other side of the spring receiving space so as to be inserted into the separation preventive groove.

8. The lock of claim 7, wherein a slant surface is formed at the end of the separation preventive protrusion.

9. A lock of information reproducer for car, comprising:
   a contact support unit fixed to an inner side of a car so as to have a receiving space for receiving an information reproducer;
   a separation preventive member installed in the contact support unit in order to restrict detachment of the information reproducer inserted into the receiving space by being selectively inserted into a separation preventive groove formed at one of the top surface or the bottom surface of the information reproducer;
   a rotary disk rotatively installed in the contact support unit in order to move the separation preventive member up and down elastically;
   a rotary disk driving means installed in the contact support unit in order to rotate the rotary disk; and
   a release button installed at a side of the contact support unit in order to release elective connection between the information reproducer and the contact support unit selectively.

10. The lock of claim 9, wherein a cam contact surface is formed at a side of the separation preventive member, a separation preventive protrusion cam is formed at the rotary disk so as to, be selectively contacted with the cam contact surface of the separation preventive member, and a spring is installed at the separation preventive member in order to support the separation preventive member elastically.

11. The lock of claim 9, wherein the rotary disk driving means includes:
   a rotary disk gear unit formed at the outer circumference of the rotary disk;
   a rack member combined with the gear unit of the rotary disk;
   a gear set combined with the rack member; and
   a driving motor combined with the gear set.

12. The lock of claim 9, wherein a position fixing member is installed in the contact support unit so as to be elastically movable up and down in order to fix a position of the information reproducer inserted into the receiving space by being selectively inserted into the fixing groove, a cam contact surface is formed at a side of the position fixing member, and a fixing protrusion cam is formed on the rotary disk so as to be selectively contacted with the cam contact surface.

13. The lock of claim 9, further comprising:
   a detachment lever installed at a side of the contact support unit in order to detach the information reproducer inserted into the receiving space selectively; and
   a detachment lever driving means installed at the other side of the contact support unit in order to operate the detachment lever.

14. The lock of claim 13, wherein the detachment lever driving means includes:
   a cam protrusion formed at the detachment lever; and
   a detachment lever cam member having a cam groove in which the cam protrusion is inserted.

15. The lock of claim 9, wherein the separation preventive member includes:
a spring receiving space at the center;
a hinge protrusion portion formed at a side of the spring receiving space; and
a separation preventive protrusion formed at the other side of the spring receiving space so as to be inserted into the separation preventive groove.

16. The lock of claim 15, wherein a slant surface is formed at the end of the separation preventive protrusion.

17. A lock of information reproducer for car, comprising:
a contact support unit fixed to an inner side of a car so as to have a receiving space for receiving an information reproducer;
a separation preventive groove formed at one of the top surface or bottom surface of the information reproducer;
a separation preventive member installed in the contact support unit in order to restrict detachment of the information reproducer inserted into the receiving space by being selectively inserted into the separation preventive groove;
a separation preventive member driving means installed in the contact support unit in order to move the separation preventive member up and down selectively; and
a release button installed at a side of the contact support unit in order to release elective connection between the information reproducer and the contact support unit selectively.

18. The lock of claim 17, wherein the separation preventive member driving means includes:
a rotary disk rotatively installed in the contact support unit in order to move the separation preventive member up and down elastically;
a cam contact surface formed at the end of the separation preventive member;
a separation preventive protrusion cam formed at the rotary disk so as to be selectively contacted with the cam contact surface of the separation preventive member;
a spring installed at the separation preventive member in order to support the separation preventive member elastically; and
a rotary disk driving means having a rotary disk gear unit formed at the outer circumference of the rotary disk, a rack member combined with the gear unit of the rotary disk, a gear set combined with the rack member and a driving motor combined with the gear set.

19. The lock of claim 17, further comprising:
a position fixing member installed in the contact support unit so as to be elastically movable up and down in order to fix a position of the information reproducer inserted into the receiving space by being selectively inserted into the fixing groove; and
a position fixing member operating means for operating the position fixing member.

20. The lock of claim 19, wherein the position fixing member operating means includes:
a rotary disk rotatively installed in the contact support unit in order to move the position fixing member up and down elastically;
a cam contact surface formed at a side of the position fixing member;
a position fixing member cam formed at a side of the rotary disk so as to be selectively contacted with the cam contact surface of the position fixing member;
a spring installed at the position fixing member in order to support the position fixing member elastically; and
a rotary disk driving means having a rotary disk gear unit formed at the outer circumference of the rotary disk, a rack member combined with the gear unit of the rotary disk, a gear set combined with the rack member and a driving motor combined with the gear set.

* * * * *